Patented Nov. 18, 1947

2,430,875

UNITED STATES PATENT OFFICE 2,430,875

GRANULAR N-SUBSTITUTED POLYAMIDES

Alban T. Hallowell and Henry D. Foster, Wilmington, Del., and Arthur W. Larchar, Mendenhall, Pa., assignors to E. I. du Pont de Nemours & Company, Wilmington, Del., a corporation of Delaware No Drawing. Application February 9, 1944, Serial No. 521,660

9 Claims. (Cl. 260—72)

This invention relates to polymeric materials and particularly to improvements in the manufacture of modified polyamides in granular form.

The polyamides with which this invention is concerned are of the general kind described in U. S. Patents 2,071,250, 2,071,253 and 2,130,948, in which the average number of carbon atoms in the segments of the chain separating the amide groups is at least two, and which have been further chemically modified. Numerous examples of these polyamides are listed in Table I of U. S. Patent 2,130,948, which teaches further that filament-forming polyamides are prepared by heating the reactants beyond that point where the intrinsic viscosity of the polymer has become 0.4. The modified polyamides which, in accordance with this invention may be prepared in granular form, are the N-alkoxy-methyl polyamides. These may be prepared by condensation of an aldehyde and an alcohol with a synthetic polyamide as described in the copending application of T. L. Cairns, S. N. 445,635, filed June 3, 1942, and S. N. 507,745, filed October 26, 1943, and also in the copending applications of H. D. Foster and A. W. Larchar, S. N. 503,130, filed September 20, 1943, and Serial No. 521,659, filed February 9, 1944. The present invention provides further improvements in the methods of isolating the N-alkoxymethyl polyamides in finely divided granular form.

In the condensation of a polyamide with an aldehyde and an alcohol, the resinous product obtained generally contains both alkoxymethyl and methylol groups substituted for the carbonamide hydrogens initially present in the resin. When an acid-reacting condensation catalyst is employed in the reaction between a polyamide, an aldehyde and an alcohol, especially if the alcohol is present in excess, and the reaction temperature is above about 100° C., the reaction is directed almost exclusively towards the formation of N-alkoxymethyl rather than N-methylol polyamides. Even under these conditions, however, some unetherified methylol groups are formed, although the amount usually is only about 0.5 to 1.0 per cent, based on the weight of the resin. Even this small amount of unetherified methylol groups interferes with the granulation of alkoxymethyl polyamides. The granulation is generally conducted by precipitating the resin from solution in a water-miscible solvent by addition of water under carefully controlled conditions, followed by mechanical working of the precipitated resin in the presence of water.

An object of the present invention is to provide an improved process for the manufacture of N-alkoxymethyl polyamides in granular form. Another object is to provide more precise control over the method of granulating N-alkoxymethyl polyamides than has been possible hitherto. A further object is to provide a process for pretreating N-alkoxymethyl polyamides, whereby less mechanical working will be required to produce the desired granulation.

These and other objects are accomplished in accordance with this invention by reducing the methylol content of N-alkoxymethyl polyamides to below about 0.4% prior to granulation. The selective removal of methylol groups from N-alkoxymethyl polyamides which contain N-methylol groups may be effected as described in the copending application S. N. 507,745 of T. L. Cairns, filed October 26, 1943.

In a preferred embodiment of the present invention, an N-alkoxymethyl polyamide, made by acid condensation of a polyamide with formaldehyde and an alcohol, and containing several tenths of a per cent of methylol groups, is treated, prior to granulation, with an aqueous or an alcoholic solution of a reagent such as a water-soluble sulfite, hydroxide, or carbonate of an alkali metal or alkaline earth metal, whereby the methylol content of the resin is reduced to below 0.4%. Reduction of the methylol content can be achieved also by prolonged storage of the resin in an alcoholic ammonia solution. The solution of N-alkoxymethyl polyamide, after the treatment for removal of methylol groups is mixed with sufficient water to cause precipitation of the resin as a resin-containing slimy fluid, which, upon working in a dough mixer with additional quantities of water, yields first a stiffened resinous mass, and then a dispersion of fine solid particles.

The condensation of polyamide with formaldehyde and alcohols may be effected by treating a polyamide, such as polyhexamethylene adipamide, with an excess of formaldehyde and an alcohol in the presence of an acid catalyst, suitably with agitation in a closed vessel at 100° to 150° C. Phosphoric acid is the preferred acid-reacting catalyst. The amount of catalyst should be about 1 to 10% of the weight of polyamide used. Other suitable catalysts include formic, acetic, oxalic, trimethyl acetic, benzoic, sulfuric, p-toluenesulfonic, hydroxyacetic and maleic acids. The preferred procedure is as follows: 1 part polyamide, 0.8 to 1.5 parts of formaldehyde, and 1.0 to 2.0 parts of methanol are charged into a pressure vessel equipped with an agitator. The mixture is heated to a temperature of 100° to 150°

C., and 0.03 to 0.05 part of phosphoric acid (85%) is injected rapidly (10 to 15 seconds). After a reaction time of about 15 minutes or less (preferably 8 to 12 minutes), the reaction mixture is forced out of the reaction vessel into a quenching bath which preferably is an aqueous alcohol solution containing sufficient alkaline reagent, such as ammonia, to neutralize the phosphoric acid. As an example, a satisfactory quenching medium may contain about 2.6 parts of methanol, 0.8 part of water and 0.08 part 28% aqueous ammonia per part of polyamide. The resulting mixture is cooled to about room temperature, and then freed of solid impurities by filtration or centrifuging. The solution obtained in this manner may be treated directly with a reagent for removal of N-methylol groups from the resin, or the resin may first be isolated by precipitation with water, and subsequently treated in the form of an aqueous slurry with the N-methylol-removing agent.

A convenient method for isolating the N-alkoxymethyl polyamides in granular form is by treating the solution of N-alkoxymethyl polyamide with water to precipitate a resin-containing fluid, agitating this fluid with aqueous sodium hydroxide or other N-methylol-removing reagent, and working the resulting product mechanically in the presence of water until the resin stiffens and ultimately breaks up in fine granular form. As an example, the solution of N-alkoxymethyl polyamide, prepared as described above, is poured into a relatively large volume of water whereby a resin-containing fluid layer precipitates. This fluid is allowed to stand for 24 hours under water, and is thereafter transferred to a dough mixer where it is worked with water for about 30 minutes to remove unreacted alcohol and aldehyde. The resulting doughy mass is worked with a 1% sodium hydroxide solution for 15 minutes at 50° C., whereby granulation occurs, usually in about one-half to two hours. The resulting resin is found to have a methylol content of 0.1%. Without the sodium hydroxide treatment the resin contains 0.5 to 0.7% of methylol.

The treatment for removal of N-methylol groups results in economies in the granulation operation by reducing the amount of mechanical working which is necessary to produce the granulation. The time required for the granulation, it is now discovered, increases with the methylol content. Thus, if the polymer contains less than 0.2% of methylol, it can be granulated by working in dough mixer in the presence of water for about two hours or less. The polymers which contain 0.3% of methylol generally require several hours to granulate, and when the methylol content exceeds 0.4% granulation is difficult or impossible to achieve by the methods at present available. Hence it is preferred to reduce the N-methylol content to 0.2% or lower.

It is, of course, also desirable to remove the N-methylol groups selectively, i. e. without simultaneous destruction of the N-alkoxymethyl groups. Prolonged treatment with the methylol-removing agent at high temperature is therefore to be avoided.

The invention is further illustrated by the following examples, in which parts are by weight except when otherwise specified.

*Example I.*—A solution of 60 parts of polyhexamethylene adipamide in about 35 parts of 90% formic acid and 78 parts of acetic anhydride was reacted with a solution of 70 parts of paraformaldehyde in 52 parts of methanol for 30 minutes at a temperature of 65° to 70° C. Approximately 71 parts of methanol were added during this period. The resulting reaction mixture was poured into 450 parts of acetone, 450 parts of ice and 189 parts of water. After neutralizing the mixture with ammonia, the polymer mass was withdrawn and washed for one hour with water in a dough mixer. To this 2.8 parts of sodium sulfite was added and worked with the resin for 20 minutes. Thereafter the mixture was heated to 90° C. for 1 hour, after which the polymer was washed free of sulfite. Upon further working in the mixer, the polymer broke up into fine solid particles which could be hardened by treatment with cold water.

*Example II.*—In a steam jacketed, nickel-lined autoclave was placed 70 parts of polyhexamethylene adipamide cut to pass a 1/8" screen, 70 parts paraformaldehyde, and 107.5 parts of methanol. This mixture was heated with agitation to 139° C. and a solution of 1 part of methanol and 2.5 parts of 85% phosphoric acid was injected rapidly (10–15 seconds). The reaction mixture was held at 139° C. for 8 minutes after the addition of the catalyst and was then discharged rapidly into a solution containing 90 parts methanol, 56 parts of water, and 5.6 parts 28% aqueous ammonia. The resulting solution was cooled and filtered to remove a small amount of solid matter. A sample of the resin was isolated by precipitation with water followed by washing and drying. It had a methoxyl content of 10.4% and a methylol content of 0.51%, corresponding to a total amide substitution of about 48%. The solution thus prepared was used in the examples which follow.

(A) A portion of the solution prepared as described above was stored at room temperature for 7 days. It was thereafter treated with hot water in sufficient quantity to precipitate the resin as a slimy fluid. The latter was worked for 70 minutes with water at 21° C. in a dough mixer, after which it began to assume a spongy, somewhat cellular structure. Further working for about 2 hours caused the mass to break up completely into small granules. These were separated from the mother liquor by centrifuging and washing. After being dried the granular resin was found to have a methylol content of 0.26%.

(B) A portion of the solution prepared as described above was held for 16 hours at a temperature of 50° to 60° C. The resin was then precipitated as a slime and worked in a dough mixer with water at 30° to 32° C. A granular product was obtained after working for 4 hours in the mixer (methylol content, 0.3%).

Similar treatment of the solution without the preheating treatment gave a resinous mass which would not granulate even after 8 hours mixing.

(C) Two hundred parts of solution prepared as described above was poured with agitation into 1500 parts of 1.6% NaOH solution. After 13 minutes the resin mass was removed from the alkaline precipitation liquor and worked with water at 31° to 33° C. in a dough mixer. At the end of two hours, the resin had broken up into small granules. Its methylol content was 0.10%.

*Example III.*—A mixture containing 70 parts of polyhexamethylene adipamide, 70 parts of formaldehyde, and 107.5 parts of methanol was heated to 130° C. At that temperature a mixture containing 1 part of methanol and 2.5 parts of 85% phosphoric acid was injected, and the resulting condensation reaction was permitted to take place for a period of 8 minutes, after which the mixture was discharged into a quench liquor containing 128 parts of methanol, 56 parts of water and 3.35 parts of sodium hydroxide. The crude quench liquor contained a fine precipitate of sodium phosphate, and in consequence filtered rather slowly. The sodium hydroxide reacted with the resin to reduce the methylol content and the resin was isolated from the resulting filtrate as a slime by precipitation with hot water, and was worked in a dough mixer with water at a temperature of 28° C. The resin granulated nicely after working in a mixer for 2 hours. The finished product contained 0.11% methylol and 10.3% methoxyl.

The polyamides which may be treated by the general method described above include polyhexamethylene adipamide, polyhexamethylene sebacamide, and polyamides derived from epsilon-aminocaproic acid. In general, polyamides are linear synthetic resins having a recurring

group (X being oxygen or sulfur). Interpolymers of such polyamides also may be used. In the preparation of N-alkoxymethyl polyamides, alcohols in general condense with formaldehyde and the polyamide, suitable alcohols being methanol, ethanol, isopropanol, n-propanol and allyl alcohol. It is not necessary, although it is usually preferred to use the same alcohol in the quenching bath as in the condensation mixture.

The granular N-alkoxymethyl polyamides prepared in accordance with this invention are useful in the manufacture of molded products, foils, filaments, bristles, coatings, self-sealing fuel cells, electrical insulation and the like.

It is to be understood that many apparently different embodiments of the present invention may be made without departing from the spirit and scope thereof, and that accordingly we do not limit ourselves, except as set forth in the appended claims.

We claim:

1. In a process for preparing granular N-alkoxymethyl polyamides, the steps which comprise reacting, with an aqueous solution of an alkaline reagent of the class consisting of ammonia, alkali metal hydroxides, and alkali metal sulfites, a substituted polyamide containing N-alkoxymethyl substituents and more than 0.4% by weight of N-methylol substituents, said polyamide prior to substitution being a linear polymer, having recurring intralinear carbonamide groups along the chain, the average number of carbon atoms in the segments of the chain separating the amide groups being at least two, continuing the said reaction until the N-methylol content of the said substituted polyamide is reduced to below 0.4%, and thereafter granulating the resulting resin by adding water to a solution thereof in a monohydric alkanol having not more than three carbon atoms per molecule, and mechanically agitating the resultant precipitate in the presence of water.

2. In a process for preparing granular N-alkoxymethyl polyamides the steps which comprise reacting with an aqueous solution of an alkaline reagent of the class consisting of ammonia, alkali metal hydroxides and alkali metal sulfites, the substituted polyamide containing N-alkoxymethyl substituents and more than 0.4% by weight of N-methylol substituents, said polyamide prior to substitution being a linear polymer having recurring intralinear carbonamide groups along the chain, the average number of carbon atoms in the segments of the chain separating the amide groups being at least two, continuing the said reaction until the methylol content of the said substituted polyamide is reduced to below 0.2%, and thereafter granulating the resultant N-alkoxymethyl polyamide by adding water to a solution thereof in a monohydric alkanol having not more than three carbon atoms per molecule, whereby a precipitate is formed, and mechanically agitating the said precipitate in the presence of water.

3. The process set forth in claim 2 in which the alkali metal hydroxide is sodium hydroxide.

4. The process set forth in claim 2 in which the alkaline reagent is sodium sulfite.

5. In a process for preparing granular N-alkoxymethyl polyamides, the steps which comprise reacting with a dilute aqueous solution of alkali metal hydroxide a polyamide containing N-alkoxymethyl substituents and N-methylol substituents, the methylol content being greater than 0.4%, said polyamide being a linear polymer having recurring intralinear carbonamide groups along the chain, the average number of carbon atoms in the segments of the chain separating the amide groups being at least two, while mechanically agitating the resulting reaction mixture, whereby the methylol content of the said alkoxymethyl polyamide is reduced below 0.4% and granulation of the N-alkoxymethyl polyamide occurs.

6. The process set forth in claim 5 in which the N-alkoxymethyl polyamide is N-methoxymethyl polyhexamethylene adipamide.

7. A process for preparing granular N-alkoxymethyl polyamides which comprises heating at a reaction temperature in the range of 100° to 150° C., in the presence of 1% to 10% by weight of an acid catalyst of the class consisting of phosphoric, formic, acetic, oxalic, trimethyl acetic, benzoic, sulfuric, p-toluenesulfonic, hydroxyacetic, and maleic acids, a reaction mixture of one part polyamide, 0.8 to 1.5 parts of formaldehyde and 1.0 to 2.0 parts of methanol, said polyamide being a linear polymer having recurring intralinear carbonamide groups along the chain, the average number of carbon atoms in the segments of the chain separating the amide groups being at least two, quenching the resulting reaction mixture after a reaction time of from 8 to 15 minutes in an aqueous methanol solution containing sufficient ammonia to neutralize the said acid catalyst, mixing water with the quenching solution whereby a precipitate of N-alkoxymethyl polyamide is formed, stirring the said precipitate with an aqueous solution of an alkaline reagent of the class consisting of ammonia, alkali metal hydroxides, and alkali metal sulfites, until the methylol content of the N-alkoxymethyl polyamide is reduced to below 0.4% by weight, granulating the resulting N-alkoxymethyl polamide by mechanically agitating it in the presence of water, and separating the said granulated N-alkoxymethyl polyamide from the aqueous liquid associated therewith.

8. A process for preparing granular N-alkoxymethyl polyamides which comprises heating at a reaction temperature in the range of 100° to 150° C., in the presence of 1% to 10% by weight of an acid catalyst of the class consisting of phosphoric, formic, acetic, oxalic, trimethyl acetic, benzoic, sulfuric, p-toluenesulfonic, hydroxyacetic, and maleic acids, a reaction mixture of one part polyamide, 0.8 to 1.5 parts of formaldehyde and 1.0 to 2.0 parts of methanol, said polyamide being a linear polymer having recurring intralinear carbonamide groups along the chain, the average number of carbon atoms in the segments of the chain separating the amide groups being at least two, quenching the resulting reaction mixture after a reaction time of from 8 to 15 minutes in an aqueous methanol solution containing sufficient sodium hydroxide to neutralize the said acid catalyst, mixing water with the quenching solution whereby a precipitate of N-alkoxymethyl polyamide is formed, stirring the said precipitate with an aqueous solution of an alkaline reagent of the class consisting of ammonia, alkali metal hydroxides, and alkali metal sulfites, until the methylol content of the N-alkoxymethyl polyamide is reduced to below 0.4% by weight, granulating the resulting N-alkoxymethyl polyamide by mechanically agitating it in the presence of water, and separating the said granulated N-alkoxymethyl polyamide from the aqueous liquid associated therewith.

9. A process for preparing N-methoxymethyl polyamides which comprises heating at a reaction temperature in the range of 100° to 150° C. a reaction mixture of one part polyamide, 0.8 to 1.5 parts formaldehyde, and 1.0 to 2.0 parts of methanol, said polyamide being a linear polymer having recurring intralinear carbonamide groups along the chain, the average number of carbon atoms in the segments of the chain separating the amide groups being at least two, introducing into this mixture at the said reaction temperature 0.03 to 0.05 part of 85% phosphoric acid, quenching the resulting mixture after a reaction time of 8 to 15 minutes in an aqueous methanolic solution containing sufficient ammonia to neutralize the phosphoric acid, mixing water with the quenched solution whereby a precipitate containing N-methoxymethyl polyamide is formed, stirring the said precipitate with an aqueous solution of alkali metal hydroxide, until the methylol content of the resin is reduced below 0.4% by weight, granulating the resulting N-alkoxymethyl polyamide by mechanically agitating it in the presence of water, and separating the said granulated N-alkoxymethyl polyamide from the aqueous liquid associated therewith.

ALBAN T. HALLOWELL.
HENRY D. FOSTER.
ARTHUR W. LARCHAR.

REFERENCES CITED

The following references are of record in the file of this patent:

UNITED STATES PATENTS

| Number | Name | Date |
|---|---|---|
| 2,244,184 | Austin et al. | June 3, 1941 |
| 2,173,005 | Strain | Sept. 12, 1939 |

FOREIGN PATENTS

| Number | Country | Date |
|---|---|---|
| 542,128 | Great Britain | Dec. 29, 1941 |

OTHER REFERENCES

Ephraim-Inorganic Chemistry, 4th ed. (1943), Nordeman Publishing Co., Inc., N. Y., pages 801–11.